(12) United States Patent
Hill

(10) Patent No.: X9564
(45) Date of Patent: Mar. 31, 1836

(54) BOOT & SHOE SOLES, CUTTING

(76) Inventor: Jonathan Hill

United States Patent

Patent No.: X9564

Jonathan Hill of Billerica [illegible] Massachusetts

Letters Patent

The Schedule referred to in these Letters Patent and making part
of the same containing a description in the words of the Jonathan Hill
himself of his improvement in the Instrument for cutting Boot
and Shoe Soles We it known to all to whom these presents shall come that I Jonathan
Hill of Billerica in the County of Middlesex and State of Massachusetts [illegible]
invented a new and useful instrument for cutting soles for Boots & Shoes
and that the following is an exact and full description of said Instrument
as invented by me. A hoop about eight inches in diameter is made
of steel plate about two inches wide, which being made sharp at one
end forming an endless knife which is bent in such a manner that the [illegible]
conforming to the shape of the sole of a Boot. From the back of this
knife or cutter at the points which constitute the heel and the toe of the
figure, two arms project parallel to each other an inch or more, [illegible]
one inch wide and one fourth of an inch thick. The cutter being placed
on a plane horizontal surface of a block of wood, two bars of iron one
foot in length are placed parallel to each other on the back of the cutter
extending lengthwise, one on each side of the two arms which project
upward. These bars are drawn towards each other by screws which pass
horizontally through both till they press hard on the two arms. When the
cutter is to be used a piece of sole leather is placed on the block [illegible]
and the cutter is placed thereon and may be pressed down by an [illegible]
lever or may be attached by means of the iron bars and screws to the [illegible]
tical slide of a lever press such for instance as that described in [illegible]
[illegible] operative mechanic Volume 1st page 334. I claim as my inven
tion the construction of the knife being entire and of one piece and the
application of the same to the purpose of cutting soles by means of a [illegible]
lever press Witnesses { [illegible] [illegible]
Wm [illegible] Whitford Jon. Hill (Granted May 31. 1836)